Patented May 5, 1953

2,637,648

UNITED STATES PATENT OFFICE 2,637,648

PRODUCTION OF FERROSILICON

Marvin J. Udy, Niagara Falls, N. Y.

No Drawing. Application August 11, 1948,
Serial No. 43,775

10 Claims. (Cl. 75—10)

This invention relates to metallurgy and has for an object the provision of a process for utilizing various silicate minerals for the production of useful products. More particularly, the invention contemplates the provision of a process for utilizing a silicate of a base metal of the group consisting of magnesium, aluminum, potassium, sodium and lithium for the production of useful separate products comprising the base metal and the silicon of the silicate. A further object of the invention is to provide a process for utilizing a silicate of a base metal of the group consisting of magnesium, aluminum, potassium, sodium and lithium in the production of ferrosilicon and a product comprising the base metal. Another object of the invention is to provide a process for utilizing a silicate of a base metal of the group consisting of magnesium, aluminum, potassium, sodium and lithium in the production of a product consisting essentially of metallic iron and a product comprising the base metal.

The invention is particularly suitable for use in the utilization of such magnesium-bearing minerals as serpentine and olivine which are plentiful in nature and which are composed of elements useful in industry. The invention makes possible the economical recovery from silicate minerals of such products as magnesium oxide, potassium oxide and lithium oxide which are scarce or expensive or which are becoming scarce or expensive. Thus, for example, in the United States and Canada, supplies of high-grade magnesite for the production of magnesia are limited, whereas, there are abundant supplies of such magnesium-bearing minerals as olivine and serpentine. The present invention permits the economical recovery from such minerals of a high-grade magnesium oxide product and, thus, adds materially to the available supply of materials useful in the production of magnesia for the production of refractories and for the production of substantially pure metallic magnesium.

Typical analyses of dehydrated or calcined serpentine and natural olivine suitable for use in carrying out a process of the invention are as follows:

*Dehydrated or calcined serpentine*

| | Per cent |
|---|---|
| MgO | 42.8 |
| $SiO_2$ | 47.6 |
| $Fe_2O_3$ | 9.5 |
| CaO | 0.1 |

*Natural olivine*

| | Per cent |
|---|---|
| $Al_2O_3$ | 0.2 |
| FeO | 7.8 |
| MgO | 49.5 |
| $SiO_2$ | 41.1 |
| CaO | 0.4 |
| $Cr_2O_3$ | 0.6 |
| Ignition loss | 0.3 |

The invention is based on my discovery that silicate minerals of the light base metals of the group consisting of magnesium, aluminum, potassium, sodium and lithium may be reduced with the production and vaporization of the light base metals and with reduction and retention of silicon when the minerals are smelted in an electric furnace in the presence of a carbonaceous reducing agent such, for example, as coke. In order to retain the silicon in the furnace and permit separation and recovery of a product comprising the light base metal, it is essential that a collector for the elemental silicon, such as iron be provided. When a charge comprising the silicate mineral of the light base metal also includes metallic iron or reducible iron in addition, a product of the smelting or reducing treatment is molten ferrosilicon which may be tapped from the furnace. In order to avoid or limit contamination of the volatilized light base metal with silicon, I prefer to make available for retention of the silicon iron in amount sufficient to form a ferrosilicon product containing at least fifty percent of iron by weight. Iron may be provided in the form of metallic scrap or in the form of iron oxide such as iron ore. The volatilized light base metal may be collected as metal vapor which may be condensed and solidified or provision may be made for oxidizing the metal while in vapor form after it has been withdrawn from the furnace to form finely divided metal oxide.

Other minerals such, for example, as andalusite, beryl, leucite, pyroxene and feldspars may be treated successfully in accordance with the invention.

When leucite is employed in carrying out a process of the invention, potassium is reduced and vaporized. The elemental potassium produced and vaporized may be collected and recovered as metallic potassium or it may be collected in the form of potassium oxide or potassium hydroxide, depending upon the type of collecting system employed.

In carrying out a process of the invention, I prefer to produce a ferrosilicon product containing less than fifty percent of silicon and preferably containing not more than about fifteen percent of silicon. Provision for the production of ferrosilicon low in silicon provides for more effective prevention of volatilization of silicon with consequent contamination of the light base metal product and the production of the low-silicon ferrosilicon provides a product which can be marketed as such for the uses to which ferrosilicon normally is put or which can be utilized advantageously for the treatment of iron ore to produce pig iron.

Unless there exists in the area of production a ready market for all the ferrosilicon produced, I prefer to use this alloy in the molten state in a second furnace and treat it with iron ore and lime to produce pig iron through the use of its silicon content to reduce the iron of the iron ore and thus form a product for which there exists a market large enough to absorb the production. To accomplish this purpose, I prefer to tap the molten ferrosilicon from the furnace in which it is produced into a second furnace, which may be a furnace of the open arc electric type or an oil or coal fired open hearth type of furnace.

The process of the invention is of particular interest to sections of the United States like the Pacific Northwest where a steel industry is non-existent but desirable or necessary and where there is neither high-grade iron ore nor good-quality coke available at commercially economical prices. The process of the invention can be used advantageously to produce alumina ($Al_2O_3$) from the high iron bauxite, magnesia (MgO) from the olivine and serpentine, and potassium oxide ($K_2O$) from the leucite minerals of the West and Northwest, and it can serve, at the same time, to produce iron and steel.

I claim:

1. The method of utilizing a silicate of a base metal of the group consisting of magnesium, aluminum, potassium, sodium and lithium which comprises smelting a charge comprising such a silicate, iron-bearing material of the group consisting of metallic iron and iron oxide and solid carbonaceous reducing material in an electric furnace to reduce to the elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, and withdrawing the molten ferrosilicon from the furnace.

2. The method of utilizing a silicate of a base metal of the group consisting of magnesium, aluminum, potassium, sodium and lithium which comprises smelting a charge comprising such silicate, iron oxide-bearing material and solid carbonaceous reducing material in an electric furnace to reduce to the elemental state and vaporize the base metal of the silicate, to reduce to the elemental state silicon of the silicate and to reduce to the elemental state iron of the iron oxide-bearing material to form molten metallic iron for collecting elemental silicon produced with the production of molten ferrosilicon containing not more than about fifteen percent by weight of silicon, collecting the vaporized base metal, and withdrawing the molten ferrosilicon from the furnace.

3. The method of utilizing a silicate of a base metal of the group consisting of magnesium, aluminum, potassium, sodium and lithium which comprises smelting a charge comprising such a silicate, metallic iron-bearing material and solid carbonaceous reducing material in an electric furnace to reduce to elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, and withdrawing the molten ferrosilicon from the furnace.

4. The method of utilizing a silicate of a base metal of the group consisting of magnesium, aluminum, potassium, sodium and lithium which comprises smelting a charge comprising such a silicate, iron-bearing material of the group consisting of metallic iron and iron oxide and solid carbonaceous reducing material in an electric furnace to reduce to the elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, withdrawing the molten ferrosilicon from the furnace, and utilizing the ferrosilicon in the treatment of iron ore for the production of metallic iron.

5. The method of utilizing a silicate of a base metal of the group consisting of magnesium, aluminum, potassium, sodium and lithium which comprises smelting a charge comprising such a silicate, iron-oxide-bearing material and solid carbonaceous reducing material in an electric furnace to reduce to the elemental state and vaporize the base metal of the silicate, to reduce to the elemental state silicon of the silicate and to reduce to the elemental state iron of the iron oxide-bearing material to form molten metallic iron for collecting elemental silicon produced with the production of molten ferrosilicon, containing not more than about fifteen percent by weight of silicon, collecting the vaporized base metal, withdrawing the molten ferrosilicon from the furnace, and utilizing the ferrosilicon in the treatment of iron ore for the production of metallic iron.

6. The method of utilizing a silicate of a base metal of the group consisting of magnesium, aluminum, potassium, sodium and lithium which comprises smelting a charge comprising such a silicate, metallic iron-bearing material and solid carbonaceous reducing material in an electric furnace to reduce to the elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, withdrawing the molten ferrosilicon from the furnace, and utilizing the ferrosilicon in the treatment of iron ore for the production of metallic iron.

7. The method of utilizing a silicate of a base metal of the group consisting of magnesium, aluminum, potassium, sodium and lithium which comprises smelting a charge comprising such a silicate, iron-bearing material of the group consisting of metallic iron and iron oxide and solid carbonaceous reducing material in an electric furnace to reduce to the elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, withdrawing the molten ferrosilicon from the furnace, and utilizing the ferrosilicon while molten in the treatment of iron ore for the production of metallic iron.

8. The method of utilizing a silicate of a base metal of the group consisting of magnesium, aluminum, potassium, sodium and lithium which comprises smelting a charge comprising such a silicate, iron oxide-bearing material and solid carbonaceous reducing material in an electric furnace to reduce to the elemental state and vaporize the base metal of the silicate, to reduce to the elemental state silicon of the silicate and to reduce to the elemental state iron of the iron oxide-bearing material to form molten metallic iron for collecting elemental silicon produced with the production of molten ferrosilicon containing not more than about fifteen percent by weight of silicon, collecting the vaporized base metal, withdrawing the molten ferrosilicon from the furnace, and utilizing the ferrosilicon while molten in the treatment of iron ore for the production of metallic iron.

9. The method of utilizing a silicate of a base metal of the group consisting of magnesium, aluminum, potassium, sodium and lithium which comprises smelting a charge comprising such a silicate, metallic iron-bearing material and solid carbonaceous reducing material in an electric furnace to reduce to the elemental state and vaporize the base metal of the silicate, to reduce to the elemental state silicon of the silicate and to form molten metallic iron for collecting elemental silicon produced with the production of molten ferrosilicon containing not more than about fifteen percent by weight of silicon, collecting the vaporized base metal, withdrawing the molten ferrosilicon from the furnace, and utilizing the ferrosilicon while molten in the treatment of iron ore for the production of metallic iron.

10. The method of utilizing a silicate of a base metal of the group consisting of magnesium, aluminum, potassium, sodium and lithium which comprises smelting a charge consisting essentially of such a silicate, iron-bearing material of the group consisting of metallic iron and iron oxide and solid carbonaceous reducing material in an electric furnace to reduce to the elemental state and vaporize the base metal of the silicate, to reduce silicon of the silicate and to form metallic iron for collecting elemental silicon produced with the production of molten ferrosilicon containing less than fifty percent by weight of silicon, collecting the vaporized base metal, and withdrawing the molten ferrosilicon from the furnace.

MARVIN J. UDY.

References Cited in the file of this patent

UNITED STATES PATENTS

| Number | Name | Date |
|---|---|---|
| 904,263 | Kaiser | Nov. 17, 1908 |
| 927,758 | Sinding-Larsen | July 13, 1909 |
| 1,297,297 | Johnson | Mar. 11, 1919 |
| 1,878,939 | Lester | Sept. 20, 1932 |
| 2,294,546 | Gentil | Sept. 1, 1942 |
| 2,396,658 | Hybinette et al. | Mar. 19, 1946 |
| 2,420,564 | Royster | May 13, 1947 |